Patented Dec. 26, 1967

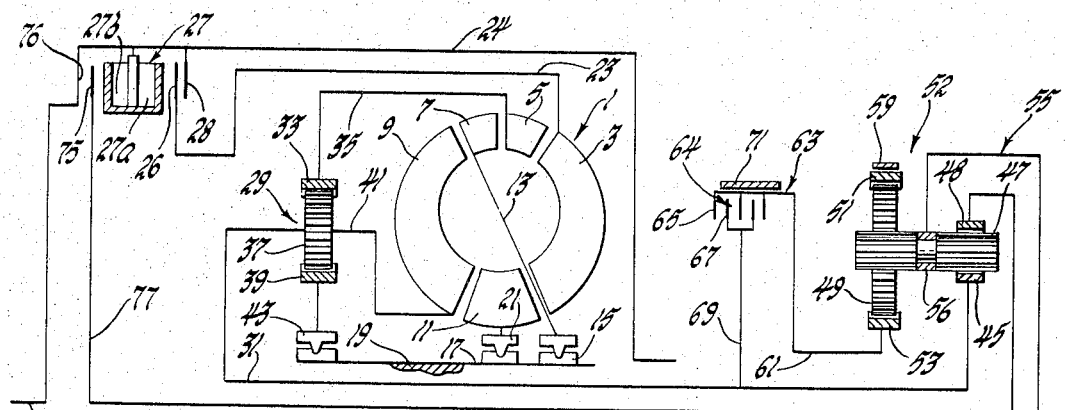

3,359,827
TRANSMISSION
Charles S. Chapman, Jr., Grand Blanc, and Frank H. Walker, Flint, Mich., assignors to General Motors Corporation, Detroit, Mich., a corporation of Delaware
Filed Sept. 14, 1964, Ser. No. 396,021
12 Claims. (Cl. 74—677)

This invention relates generally to improvements in transmissions and more particularly to transmissions having a hydraulic torque converter in combination with a torque converter planetary gear set and a range planetary gear set which provides torque paths for underdrives, direct drive, overdrive and reverse drive.

In this transmission a torque converted planetary gear unit is operatively coupled to a multi-turbined torque converter to initially multiply turbine torque for high torque demand used for normally starting a vehicle. As the vehicle gains speed and momentum and as the torque requirements decrease, the converter automatically upshifts providing decreasing converter torque; also the turbine torque is transmitted by the gear unit without further torque multiplication for economical engine operation. This invention also utilizes a range gear unit which includes an emergency low drive by further multiplying converter and converter gear unit torque to meet exceptionally high torque requirements such as when the vehicle ascends long, steep grades. For highly efficient cruising this transmission provides for overdrive using in one embodiment the range unit gearing and in other embodiments the converter planetary gearing.

An object of this invention is to provide a new and improved transmission which selectively provides a wider range of ratio drives.

It is also an object of this invention to provide a new and improved transmission which includes a hydraulic torque converter combined with the torque converter gear set and a compound range planetary gear set to provide torque paths for forward drives, reverse and overdrive.

Another object of this invention is to provide a new and improved transmission which includes a two-stage torque converter, a torque converter gear set to increase converter torque in one condition of converter operation and to transmit converter torque without substantial change in another condition of converter operation; in addition to a range planetary gear set to further multiply torque for underdrive operation, to transmit torque without gear action for direct drive operation, to reverse direction of torque application for reverse drive operation and to provide an overdrive.

Another object of this invention is to provide a transmission which includes a hydraulic torque converter, a supplementing torque converter planetary gear set for increasing converter torque in one condition of converter operation, for transmitting converter torque without change in another condition of converter operation, and to additionally provide an overdrive.

Another object of this invention is to provide a transmission having a hydraulic torque converter, a converter planetary gear set for increasing converter torque in one condition of converter operation and for transmitting torque without change in another condition of converter operation, and including a drive shaft which can be selectively connected to an output gear of the converter gear set for overdrive.

These and other objects of the invention will become more apparent from the specification and drawings showing the preferred embodiment of this invention.

In the drawings:
FIGURE 1 is a schematic view showing a torque converter transmission with a converter gear set which is combined with a range gear set in the form of a compound planetary gear set;
FIGURE 2 is a schematic view similar to that of FIGURE 1, showing a second embodiment of this invention; and
FIGURE 3 is a schematic view similar to the views of FIGS. 1 and 2 showing a further embodiment of this invention.

The transmission shown in FIG. 1, includes a torque converter 1 formed with a bladed pump 3, first turbine 5, first stator 7, second turbine 9, and second stator 11 which forms a five-element, two-stage torque converter. Stator 7 is held by a support member 13 on a one-way brake 15. This one-way brake is secured to a reaction shaft 17 which is grounded to transmission case 19. This brake permits the stator to rotate in a forward direction and prevents reverse rotation. The stator 11 is connected to one-way braking device 21 also secured to the reaction shaft. Pump housing 23 can be connected to a housing 24, driven by input shaft 25, by double-acting clutch 27. This clutch when actuated in one direction by supply of fluid to chamber 27a engages a drive friction plate 26 connected to the housing 23 with backing plate 28 on housing 24. The housing 23 and the pump can be rotated by the input shaft when the clutch is appropriately applied and the input shaft is actuated. A converter planetary gear set 29 connects both of the turbines to a first drive shaft 31 and also connects the first turbine to the second turbine in a manner which permits the first turbine to rotate the drive shaft 31 and the second turbine at a reduced speed. This gear set will also allow the second turbine to accelerate to the speed of the first turbine and drive shaft 31 at a higher speed without torque multplication by the gear set.

The first turbine 5 is connected to the ring gear 33 of the converter planetary gear set by a hub and disc assembly 35. The converter planetary gear set also includes planetary gears 37 which mesh with this ring gear and sun gear 39. The sun gear 39 is fixed by its hub to a one-way brake 43 which in turn is fastened to the reaction shaft. A carrier 41 for the planet gears is secured to the second turbine and is also connected to a drive shaft 31. The carrier rotates that drive shaft when the turbine multiplies or transmits sufficient engine torque to move the vehicle. Drive shaft 31 is operatively connected to an input sun gear 45 of the range planetary gearing 52.

The range gearing is in the form of a compound planetary gear set, having long planet gears 47 meshing with large sun gear 45, ring gear 48, and short planet gears 49 which mesh with small sun gear 53 and reverse ring gear 51. A carrier 55 for the long and short planetary gears provides an output for the range gearing. As shown in FIG. 1, a sleeve bearing member 56 rotatably secures the long planet gears to the carrier. A pinion shaft, like shaft 155 of FIG. 2, rotatably mounts short planet gears on the carrier. Output shaft 57 connected to the carrier provides the final transmission output.

Suitable braking and clutching devices are utilized with the range gearing providing various forward gear ratios and reverse. Thus, in FIG. 1 a brake band 59 is adapted to be selectively engaged with the reverse ring gear 51 to hold this ring gear for reaction to produce reverse drive. The small sun gear 53 of the range unit is connected by a hub member 61 to the housing 63 of clutch 64. This clutch housing includes clutch plates 65, splined to the housing, which are longitudinally movable with respect to the housing by suitable control means, not shown, to engage the clutch plates 67 on support disc 69 connected to the drive shaft 31.

When clutch 64 is engaged and the torque converter transmits torque, the first drive shaft 31 will rotate both sun gears simultaneously for a 1:1 ratio in the range planetary gearing, as will be described below. A second brake band 71 can be selectively engaged with the periphery of the clutch housing to hold the small sun gear for reaction to produce high torque underdrive when range gear input is through the large sun gear and to produce an overdrive when range gear input is through the ring gear 48. This ring gear is connected by means of a second drive shaft 73 and double-acting clutch 27 to the input shaft 25. When fluid is supplied to chamber 27b the friction plate 75 and backing plate 76 will engage to connect shaft 25 and housing 24 to drive disc member 77 secured to the second drive shaft 73.

The operation of the FIGURE 1 torque converter is the same for normal, forward or direct drive, low and reverse. When the clutch member 26 and 28 are engaged, the input shaft 25 drives pump 3. Initially at low transmission output speeds most of the converter torque is developed by the first turbine while the second turbine develops only a small torque. In this condition of operation, first turbine torque is transmitted to the ring gear 33 of the front planetary unit and the sun gear is held for reaction by the one-way brake 43. Under these conditions the front planetary unit multiplies first turbine torque with carrier 41 serving as an output to drive shaft 31. As converter output speed increases, the first turbine torque decreases and second turbine torque increases. The second turbine accelerates to a speed approaching the speed of the first turbine, the sun gear 39 will be released by the one-way brake 43 and the stator 7 freewheels. When the sun gear 39 is released, the gear set transmits converter torque without further multiplication. The converter output at this time is from second turbine 9. At converter coupling the stator 11 freewheels and the converter transmits input torque without torque multiplication.

The turbine and stator operations described above do not occur at set speeds but are dependent upon torque requirements imposed by vehicle operating conditions. With a light load and steady driving torque multiplication may cease at very low vehicle speeds, but with continued acceleration some degree of torque multiplication may be present throughout the major portion of the vehicle speed range.

The converter front planetary gear unit and range planetary gear unit provide a wide range of drive ratios for efficient and effective vehicle operation. In most cases the vehicle can be operated in a normal forward or direct drive range with direct drive clutch 64 engaged since the converter and converter planetary unit develop sufficient torque ratios for initially moving the vehicle. As soon as torque requirements decrease, the converter will automatically upshift to provide for increased output speeds and reduced torque until a 1:1 ratio is obtained. However, if very large reduction ratios are needed, this transmission provides a low range drive through the converter by application of brake 71 to condition the range unit to further multiply converter torque as transmitted by the converter planetary unit to input sun gear 45. An all mechanical overdrive is also provided by application of brake 71 and driving ring gear 48. Reverse is obtained by applying brake 59 and driving the input sun gear 45.

The following schedule lists the engagement of the above-identified friction devices for establishment of reverse, low, normal forward and overdrive. In the schedule "x" indicates engagement while "o" indicates disengagement.

|  | 75–76 | 26–28 | 64 | 71 | 59 |
|---|---|---|---|---|---|
| Rev | o | x | o | o | x |
| Lo | o | x | o | x | o |
| Normal Forward | o | x | x | o | o |
| Ov | x | o | o | x | o |

The torque converter 100 of FIG. 2 is the same as that of FIG. 1 both in construction and operation. In FIG. 2, pump 103, turbines 105 and 109, stators 107 and 111, support 113, one-way brakes 115 and 121 correspond to similar elements in FIG. 1. The FIG. 2 embodiment differs from that of FIG. 1 primarily in the torque converter planetary gear set, the connection of that gearset with the input shaft and the second drive shaft, and in the range planetary gearing. The converter planetary gear set 129 of FIG. 2 includes a ring gear 133 which is connected to the first turbine through the hub and disc assembly 135. A one-way clutch 143 interposed between the ring gear and the hub member of assembly 135 permits the first turbine to drive the ring gear in the direction of pump rotation but allows the ring gear to overrun the first turbine 105 when the second turbine accelerates to first turbine speed. The ring gear 133 meshes with the planet gears 137 which in turn mesh with the sun gear 139. As shown in FIG. 2, this sun gear is connected by its hub to the reaction shaft 117 which is grounded to the transmission case 119. The second ring gear 140 is used as an output of the torque converter planetary gear set under certain circumstances, which will be described below. This gear set includes a carrier 128 formed by a first branch 141 which rotatably supports the planet gears 137 by suitable bearings 142 and a second branch 144 on which the planet gears are rotatably mounted. When the carrier is connected by the selective engagement of clutch 127 to the rotatable pump housing 123, input shaft 125 drives the carrier 128 and thereby rotates drive shaft 131. The ring gear 140 which meshes with planets 137 is connected to a second drive shaft 173 by a second clutch 130 which when applied will permit rotation of that shaft.

The first drive shaft 131 extends to the range planetary gear set 152 and provides an input drive for that gear set. The range planetary gear set includes the input sun gear 145 connected to the shaft 131, long planets 147 which mesh with the input sun gear, short planets 149 which mesh with the long planets, a ring gear 151 which meshes with the short planets, and a second sun gear 153 smaller than the first sun gear which meshes with the short planet gears. The range planetary gear set further includes a carrier 155 on which the planet gears are rotatably mounted and which provides range gear output. The carrier is operatively connected to the output shaft 157. As in the embodiment of FIG. 1, the range planetary gear set is provided with clutching and braking devices selectively used to operate the range gear set. As shown in FIG. 2 a brake band 159 can be selectively engaged with the outer periphery of the ring gear 151 to hold that ring gear for reaction for reverse drive. The second sun gear 153 is connected by hub member 161 to housing 163 for clutch 164. The clutch includes clutch plates 165 which are splined in the housing 163 and which can be moved by a clutch actuator, which is not shown, into engagement with clutch plates 167 provided on disc member 169 connected to the shaft 131. When the clutch 164 is engaged, the sun gears 153 and 145 will be simultaneously rotated by shaft 131 and the range planetary gear set will lock up for direct drive without gear action. A brake band 171 is positioned to selectively engage the outer periphery of clutch housing 163. If this brake band is engaged, the small sun gear 153 will be held for reaction and, when the large sun gear 145 is rotated by shaft 131, an underdrive ratio will result. When clutches 127 and 130 are engaged, there will be carrier input into the torque converter planetary gear set and ring gear output to provide overdrive.

The following schedule lists the engagement of the identified friction devices for reverse, low range, normal forward and overdrive for the FIGURE 2 embodiment. In overdrive the one-way clutch 143 disconnects the ring gear 133 and first turbine 105. In this embodiment reverse, low and high range drives are converter drives and overdrive is a mechanical drive through the front gear unit.

|  | 130 | 127 | 164 | 171 | 159 |
|---|---|---|---|---|---|
| Rev | o | o | o | o | x |
| Lo | o | o | o | x | o |
| Normal Forward | o | o | x | o | o |
| Ov | x | x | o | o | o |

In the embodiment of FIG. 3, the torque converter 200 is identical to the torque converters of FIGS. 1 and 2 with pump 203, turbines 205 and 209, stators 207 and 211, stator support 213 and one-way brakes 215 and 221 corresponding to similar elements of converters 1 and 100. Furthermore, the range gearing 252 of FIG. 3 is the same as the range gearing 152 of FIG. 2 with sun gears 245 and 253, planet gears 247 and 249, ring gear 251, brakes 259 and 271 and clutch 264 corresponding to similar elements of FIG. 2.

The torque converter planetary gear set of FIG. 3 includes a ring gear 233, planetary gears 237 and a sun gear 239 which is grounded to the transmission case 219 by reaction shaft 217. The ring gear 233 is connected to the first turbine by turbine hub and disc assembly 235. A one-way clutch 243 interposed in the connection between the ring gear and the assembly permits the first turbine 205 to drive the ring gear in the direction of rotation of the pump 203 and permits the first turbine to freewheel at a slower speed when not driving. The torque converter planetary gear set also includes a planet gear carrier 241 connected to the second turbine 209, which connects the converter planetary gear set to the drive shaft 231. A selectively engageable clutch 230 connects the ring gear 233 to a second drive shaft 273 operatively secured to the output shaft 257. The first drive shaft is secured to the input sun gear 245 of the range planetary set 252 which meshes with the long planets 247. The long planets 247 mesh with the short planets 249 which in turn mesh with ring gear 251 and small sun gear 253. The carrier 255 for these planet gears is fastened to the output shaft 257.

As in the embodiment in FIG. 2, the ring gear of the range gear set can be engaged by brake band 259 and held for reaction for reverse drive. Similarly, the sun gear 253 can be clutched to the drive shaft by a clutch 264 to lock up the range gear set for direct drive or the clutch can be disengaged and brake band 271 engaged with the periphery of the clutch housing 263 to hold the small sun gear for reaction for underdrive.

The following schedule lists the engagement of the identified FIGURE 3 friction devices for the establishment of reverse, low, normal forward and overdrive ratios. It will be seen from this schedule that all drives including overdrive are through the converter.

|  | 230 | 264 | 271 | 252 |
|---|---|---|---|---|
| Rev | o | o | o | x |
| Lo | o | o | x | o |
| Normal Forward | o | x | o | o |
| Ov | x | o | o | x |

From the accompanying drawings and the foregoing description it will be appreciated that this invention provides a torque converter transmission having a torque converter gear set and a range gearing cooperating to accomplish underdrives, 1:1 drive, overdrive and reverse. Although particular embodiments of the invention have been illustrated and described in detail, it will be understood that the invention is not to be regarded as correspondingly limited in scope, but encompasses all changes and modifications falling within the terms of the claims.

We claim:

1. In a transmission comprising an input member, a hydrodynamic torque converter having a pump and first and second turbines, means connecting said pump with said member, a torque converter planetary gear set, a range gear set, first and second drive shafts, and an output member, said converter gear set being formed by a ring gear, meshing planet gears, and a sun gear, means connecting said first turbine to said ring gear, a carrier for said planet gears, said carrier being operatively connected to said second turbine and to said first drive shaft, said range gear set having first and second sun gears of differing pitch diameters, first planet gears meshing with said first sun gear, second planet gears meshing with said first planet gears and said second sun gear, a first ring gear meshing with said first planet gears and a second ring gear meshing with said second planet gears, a carrier for said first and second planet gears of said range gear set, said output member connected to said last-mentioned carrier, said first ring gear connected to said second drive shaft, said first sun gear of said range gear set being connected to said first drive shaft, braking means selectively engageable with said second ring gear for holding said second ring gear for reaction, second selectively engageable braking means for releasably holding said second sun gear of said range gearing for reaction, third releasably engageable means for connecting said second sun gear to said first drive shaft for rotation therewith, selectively engageable clutch means conditionable to operatively connect said pump with said input member and also conditionable to operatively connect said second drive shaft with said input member while disconnecting said pump from said input member.

2. A transmission comprising an input shaft, a hydrodynamic torque converter operatively connected with said input shaft, first and second drive shafts, and an output shaft, gear unit means drivingly connecting said torque converter to said first drive shaft for multiplying the torque output of said torque converter, a range planetary gear set including first and second sun gears of different pitch diameters, first planet gears meshing with said first sun gear, second planet gears meshing with said first planet gears and said second sun gear, a first ring gear meshing with said first planet gears and a second ring gear meshing with said second planet gears, a carrier for said planet gears, said carrier being operatively connected to said output shaft, selectively engageable means for securing said second sun gear to said first drive shaft for rotation therewith, second selectively engageable means for holding one of said gears in said range gear set for reaction, said first ring gear being connected to said second drive shaft to drive said carrier faster than said second drive shaft, selectively engageable means movable in one direction for operatively connecting said torque converter to said input shaft, and movable in another direction to connect said input shaft to said second drive shaft bypassing said torque converter.

3. A transmission comprising an input member, a hydrodynamic torque converter with a pump and first and second turbines, means operatively connecting said pump to said input member, first and second drive shafts, a torque converter planetary gear set, said torque converter planetary gear set including first and second ring gears, planet gears meshing with said ring gears and a sun gear meshing with said planet gears, a carrier assembly for said planet gears including first and second carrier members, means for holding said sun gear for reaction, means extending between said first ring gear and said first turbine to enable said first turbine to drive said first ring gear, one-way clutch means in said last-mentioned means to enable said first ring gear to overrun said turbine, selectively engageable friction means to operatively connect said second ring gear to said second drive shaft, second selectively engageable friction means to connect said first carrier member to said input member, said first carrier member being secured to said first drive shaft, said second carrier member being secured to said second turbine.

4. A transmission comprising an input member, a hydrodynamic torque converter with a pump and first and second turbines, means connecting said input member with said pump, first and second drive members, an output member, gear means drivingly connecting said torque converter to said first drive member for multiplying converter torque in one condition of converter operation and for transmitting converter torque without substantial change in another condition of converter operation, said gear means including a sun gear, meshing planet gears, first and second ring gears and a carrier assembly for said planetary gears, said carrier assembly including a first carrier member connected to said first drive member and a second carrier member connected to said second turbine, means for selectively connecting said first carrier member to said input member for rotation thereby, means for selectively connecting said second drive member to said second ring gear, said second drive member being drivingly connected to said output member, friction means connected to said sun gear engageable to condition said gear means for a predetermined speed ratio when said input drives said first carrier member, and a range planetary gear set including a sun gear connected to said first drive member and a carrier connected to said output member.

5. A transmission comprising an input member, an output member, a first torque path between said members including a twin turbine torque converter and a torque converter planetary gear set in addition to a first drive shaft and a range planetary gear set, a second torque path between said members including said torque converter and said torque converter planetary gear set and a second drive shaft, said torque converter planetary gear set including a ring gear, planet gears and a sun gear, means for holding said sun gear from rotation, carrier means for said planet gears connecting one of said turbines to said first drive shaft, torque transmitting means including a clutch for operatively connecting another of said turbines to said ring gear, said clutch being disengageable to allow said ring gear to overrun said last mentioned turbine when first turbine drives said carrier and said sun gear is held for reaction, selectively engageable clutch means for connecting said ring gear to said second drive shaft, said range planetary gear set including a first sun gear driven by said first drive shaft, a second sun gear and a ring gear, means for selectively connecting said second sun gear to said first drive shaft, means for selectively holding said second sun gear for reaction and output means for said range planetary gear set connected to said output member.

6. In a transmission, rotatable input and output members, first and second torque paths between said members, said first torque path including a hydrodynamic torque converter having a pump operatively connected with said input member and having rotatable output means, a planetary gear set in said first torque path having input means operatively connected to said converter output means and having at least one output, said first torque path further including a first drive shaft operatively connected to said last mentioned output of said gear set and a range gear set having an input gear driven by said drive shaft and an output connected to said output member, said second torque path including a second drive shaft and one of said gear sets, one of said gear sets being connected in its torque path and being conditionable to produce an overdrive ratio, and selectively engageable friction means operatively connected with said latter mentioned gear set engageable to condition said latter mentioned gear set for overdrive of said output member.

7. The transmission defined in claim 6 wherein said latter mentioned gear set is said range gear set having an input ring gear driven by said second drive shaft, said range gear set being conditioned for overdrive when said friction means holds one of the gears of said range gear set for reaction.

8. The transmission defined in claim 6 wherein said latter mentioned gear set is said converter planetary gear set, said converter planetary gearset further including an input carrier and an output ring gear, clutch means for connecting said input carrier to said input member and clutch means for connecting said output ring gear to said second drive shaft.

9. The transmission defined in claim 6 wherein said latter mentioned gear set is said planetary gear set including an input carrier connected to said input member by said torque converter and an output ring gear for driving said second drive shaft.

10. In a power transmission, an input and an output, a torque converter having a pump connected to said input and having first and second turbines, first and second torque transmitting means operatively connected to said output, a planetary gear unit having a plurality of members, first drive means operatively connecting said first turbine to a first of said members, a first engageable and disengageable clutch operatively connected in said first drive means, second drive means operatively connecting said first of said members to said second torque transmitting means, a second engageable and disengageable clutch operatively connected to said second drive means for connecting and disconnecting said second drive means and said second torque transmitting means, third drive means operatively connecting said second turbine to a second of said members and to said first torque transmitting means, means for holding a third of said members for reaction to condition said gearset for underdrive of said first torque transmitting means when said first clutch is engaged and said first turbine drives said first member and also to condition said gearset for overdrive of said second torque transmitting means when said second clutch is engaged and said first clutch is disengaged and said second turbine drives said second member, and said gearset being operative to directly transmit torque from said second turbine to said first torque transmitting means when both of said clutches are released.

11. In a transmission, an input member, an output member, a first torque path between said members including a dual turbine torque converter and a torque converter planetary gear unit in addition to a first drive shaft and a range gear unit, torque transmitting means for connecting one of said converter turbines to a first component of said gear unit, engageable and disengageable clutch means operatively connected in said torque transmitting means, means for connecting another of said converter turbines to a second component of said gear unit, means operatively connected with a third component of said gear unit for holding said third component for reaction, means for connecting said second component of said torque converter gearset to said first drive shaft, said range gearset including an input connected to said first drive shaft and an output connected to said output member, a second torque path between said members including said torque converter planetary gearset and including a second drive shaft connected to said output member, torque transmitting means operatively connecting said input member with said second component of said planetary gear unit, said last mentioned torque transmitting means including a selectively engageable clutch, and means including a selectively engageable clutch for connecting a fourth component of said torque converter planetary gearset to said second drive shaft to condition said transmission for overdrive when said clutches are engaged and said third component is held for reaction.

12. A transmission comprising an input member, an output member, a hydraulic torque converter having a pump and first and second turbines and a stator between said second turbine and said pump, one-way brake means operatively connected with said stator to retard rotation of said stator in one direction and to permit said stator to rotate in an opposite direction, means including a first selectively engageable clutch for connecting said input member and said pump, a torque converter planetary gearset operatively connected to said turbines for multiplying converter torque in one condition or converter operation and for directly transmitting torque from said converter without torque multiplication in another condition of converter operation, reaction means for said planetary gearset operative to condition said planetary gearset for torque multiplication when said converter is in the first condition of operation, a range planetary gearset, torque transmitting means operatively connecting said torque converter gearset and said range gearset, torque transmitting means including a second selectively engageable clutch for connecting said input member to said range gearset, said range gearset having an ouput connected to said ouput member, selectively engageable friction drive establishing means operatively connected to said range gearset engageable to condition said range gearset and transmission for underdrive when only said first clutch is engaged and for overdrive when said first clutch is disengaged and said second clutch is engaged.

References Cited

UNITED STATES PATENTS

| | | | |
|---|---|---|---|
| 2,280,015 | 4/1942 | Tipton | 74—677 |
| 2,695,533 | 11/1954 | Pollard | 74—677 |
| 2,519,022 | 8/1950 | Burtnett | 74—688 |
| 2,762,237 | 9/1956 | Kelbel | 74—688 X |
| 2,803,974 | 8/1957 | Kelley | 74—677 |
| 2,851,906 | 9/1958 | De Lorean | 74—677 |
| 2,886,983 | 5/1959 | Miller | 74—688 X |
| 2,919,606 | 1/1960 | Karlsson et al. | 74—688 |
| 2,968,197 | 1/1961 | De Lorean | 74—688 |
| 2,969,694 | 1/1961 | Harmon et al. | 74—688 X |
| 2,982,152 | 5/1961 | De Lorean | 74—677 X |
| 2,987,942 | 6/1961 | Jania | 74—688 X |
| 3,000,234 | 9/1961 | Burtnett | 74—688 |
| 3,021,727 | 2/1962 | Kelley et al. | 74—677 |
| 3,024,668 | 3/1962 | Kronogard et al. | 74—688 |
| 3,030,824 | 4/1962 | Moore | 74—677 |
| 3,075,408 | 1/1963 | Chapman et al. | 74—677 |
| 3,086,541 | 4/1963 | De Corte | 74—688 X |
| 3,097,544 | 7/1963 | Evernden | 74—688 |
| 2,120,763 | 2/1964 | Shuster | 74—677 X |
| 3,143,898 | 8/1964 | Evernden | 74—688 |
| 3,150,541 | 9/1964 | Flinn | 74—677 |
| 3,182,775 | 5/1965 | Schall | 192—3.2 |
| 3,188,887 | 6/1965 | Gabrial | 74—677 |
| 3,237,482 | 3/1966 | General et al. | 74—688 |

DONLEY J. STOCKING, *Primary Examiner.*

DAVID J. WILLIAMOWSKY, ROBERT M. WALKER,
*Examiners.*

J. R. BENEFIEL, *Assistant Examiner.*

UNITED STATES PATENT OFFICE
CERTIFICATE OF CORRECTION

Patent No. 3,359,827 December 26, 1967

Charles S. Chapman, Jr., et al.

It is hereby certified that error appears in the above numbered patent requiring correction and that the said Letters Patent should read as corrected below.

Column 3, line 27, for "member" read -- members --; column 6, line 23, for "said member" read -- said input member --; column 9, line 23, for "or" read -- of --; column 10, line 27, for "2,120,763" read -- 3,120,763 --.

Signed and sealed this 11th day of February 1969.

(SEAL)
Attest:

Edward M. Fletcher, Jr.
Attesting Officer

EDWARD J. BRENNER
Commissioner of Patents